United States Patent
Ziaei

(10) Patent No.: US 8,022,824 B2
(45) Date of Patent: Sep. 20, 2011

(54) ANTI-INTRUSION SYSTEM FOR PROTECTING ELECTRONIC COMPONENTS

(75) Inventor: Afshin Ziaei, Vanves (FR)

(73) Assignee: Thales (FR)

( * ) Notice: Subject to any disclaimer, the term of this patent is extended or adjusted under 35 U.S.C. 154(b) by 367 days.

(21) Appl. No.: 12/441,226

(22) PCT Filed: Sep. 12, 2007

(86) PCT No.: PCT/EP2007/059562
§ 371 (c)(1),
(2), (4) Date: Mar. 13, 2009

(87) PCT Pub. No.: WO2008/031838
PCT Pub. Date: Mar. 20, 2008

(65) Prior Publication Data
US 2009/0231133 A1   Sep. 17, 2009

(30) Foreign Application Priority Data
Sep. 15, 2006   (FR) ..................... 06 08098

(51) Int. Cl.
*G08B 13/18* (2006.01)

(52) U.S. Cl. ........ 340/562; 340/533; 340/507; 340/542; 340/534; 356/240.1; 356/239.4; 250/223

(58) Field of Classification Search .................. 340/562, 340/568, 507, 542, 691, 380, 534, 533; 356/240.1, 356/239.4, 428; 250/233
See application file for complete search history.

(56) References Cited

U.S. PATENT DOCUMENTS

| 4,262,284 | A * | 4/1981 | Stieff et al. ............. 340/541 |
| 7,042,397 | B2 | 5/2006 | Charrier et al. |
| 7,297,571 | B2 | 11/2007 | Ziaei et al. |
| 2002/0084090 | A1 | 7/2002 | Farquhar et al. |
| 2002/0199111 | A1 | 12/2002 | Clark et al. |
| 2003/0095253 | A1 * | 5/2003 | Chow ..................... 356/240.1 |

FOREIGN PATENT DOCUMENTS

| EP | 1126358 A1 | 8/2001 |
| WO | 0159544 A | 8/2001 |
| WO | 2004030005 A | 4/2004 |

OTHER PUBLICATIONS

De Los Santos H J et al: "RF MEMS for Ubiquitous Wireless Connectivity: Part 1—Fabrication"; IEEE Microwave Magazine, IEEEService Center, Piscataway, NJ, US, vol. 5, No. 4, (Dec. 2004), p. 36-49, XP011124827; ISSN: 1527-3342.
U.S. Appl. No. 12/302,829, filed May 31, 2007 (Not Yet Published).
U.S. Appl. No. 12/302,525, filed May 31, 2007 (Not Yet Published).

* cited by examiner

*Primary Examiner* — George A Bugg
*Assistant Examiner* — Ojiako Nwugo
(74) *Attorney, Agent, or Firm* — Lowe Hauptman Ham & Berner, LLP

(57) ABSTRACT

The subject of the invention is an anti-intrusion system for protecting electronic components (3) including a substrate (2) on which the electronic components are placed. A conducting enclosure (1) encapsulates the electronic components on the surface of the substrate (2). The system also includes a warning device. The system includes a transmitting antenna on the surface of the substrate (2), and a capacitive electromechanical microswitch. The microswitch is linked to the warning device by a signal line, so as to be able to activate it.

10 Claims, 7 Drawing Sheets

ANTI-INTRUSION SYSTEM FOR PROTECTING ELECTRONIC COMPONENTS

CROSS-REFERENCE TO RELATED APPLICATIONS

The present Application is based on International Application No. PCT/EP2007/059562, filed on Sep. 12, 2007, which in turn corresponds to French Application No. 06 08098 filed on Sep. 15, 2006, and priority is hereby claimed under 35 USC §119 based on these applications. Each of these applications are hereby incorporated by reference in their entirety into the present application.

TECHNICAL FILED

The field of the invention is that of anti-intrusion systems for the protection of electronic components and their application in the telecommunications field.

BACKGROUND OF THE INVENTION

The aim of an anti-intrusion system is to detect any attempted intrusion into the electronic device to be protected and activate a warning system where appropriate. The anti-intrusion systems are used to protect electronic devices for which confidentiality is to be maintained.

According to the state of the art in anti-intrusion systems, the protection can be provided by using an enclosure comprising a network of conducting wires integrated in a resin. An intrusion evidenced by a perforation of the enclosure is then detected by the appearance of a break in the conducting wires. This type of system does not give full satisfaction in its performance, notably because it does not protect against an intrusion using X-rays.

The invention, notably to overcome the problem of intrusion by X-radiation, proposes to use an entirely conducting enclosure, consisting of electromagnetic shielding and comprising microcomponents used to detect intrusions.

SUMMARY OF THE INVENTION

More specifically, the invention relates to an anti-intrusion system for protecting electronic components comprising a substrate on which the electronic components are placed, a conducting enclosure encapsulating the electronic components on the surface of the substrate, said system also including a warning device, characterized in that it comprises at least: an encapsulated intrusion detection circuit in said enclosure, said intrusion detection circuit comprising at least:
- a transmitting antenna situated on the surface of the substrate and transmitting a power signal,
- a capacitive electromechanical microswitch associated with means of receiving said power signal and said microswitch being able to detect a signal power drop and, where appropriate, activate an intrusion warning device,
- means of receiving the transmitted signal, said reception means transmitting a signal drop on an intrusion into the enclosure, said reception means being linked to said microswitch.

According to a first variant of the invention, the reception means comprise: a receiving antenna situated on the surface of the substrate and linked to the capacitive electromechanical microswitch.

According to a second variant of the invention, the reception means comprise: a conducting element linked to the conducting enclosure and to the capacitive electromechanical microswitch.

According to a third variant of the invention, the reception means comprise:
- a receiving antenna situated on the surface of the substrate and linked to a first capacitive electromechanical microswitch,
- a conducting element linked to the conducting enclosure and to a second capacitive electromechanical microswitch.

According to a variant of the invention, at least one of the capacitive electromechanical microswitches is of series type.

According to a variant of the invention, at least one of the electromechanical microswitches comprises a structure including a flexible membrane and an assembly comprising a dielectric layer, and two signal lines positioned coplanar in the extension of each other and the ends of which form a first metallic layer, said membrane being separated from the assembly by a dielectric gap.

According to a variant of the invention, the transmitting antenna transmits a power signal such that the voltage Veq applied between the membrane and the electrode is between an activation voltage Vp and a release voltage Vr, said activation and release voltages respectively satisfying the following equations:

$$V_p = \sqrt{\frac{8kg_0^3}{27\varepsilon_0 wW}}$$

where w is the width of the signal lines, W is the width of the membrane, $g_0$ is the thickness of the dielectric gap without voltage applied to the membrane, $\epsilon_o$: the permittivity of the vacuum and k the stiffness coefficient of the membrane.

$$V_r = \sqrt{\frac{2k(g_0 - t_d)t_d^2}{\varepsilon' \varepsilon_0 A \varepsilon_r^2}}$$

where $t_d$ is the dielectric thickness separating the metallic layer from the membrane, $\epsilon_r$ the relative permittivity of the dielectric, A is equal to the product wW and $\epsilon'$ is a constant making it possible to take account of the effect of the presence of the dielectric gap which modifies the permittivity of the electrodes.

Advantageously, the transmitting and receiving antennas are of bidirectional type.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The anti-intrusion system for protecting electronic components 3 according to the invention comprises a substrate 2 on which the electronic components are placed, a conducting enclosure 1 encapsulating the electronic components on the surface of the substrate 2. The intrusion detection circuit is encapsulated in said enclosure 1. It comprises at least:

a transmitting antenna 4 situated on the surface of the substrate 2 and transmitting a signal, a capacitive electromechanical microswitch, said microswitch being linked to the warning device by a signal line, so as to be able to activate it, said microswitch being able to detect a signal power drop, and means of receiving the transmitted signal, said reception means transmitting a signal drop on an intrusion into the enclosure, said reception means being linked to said microswitch.

Any intrusion or attack on the physical integrity of the conducting enclosure 1 leads to a disturbance of the transmission of the signal from the transmitting antenna 4 to the reception means, so reducing the power of the signal transmitted and provoking a change of the state of the microswitch.

Figure 1:
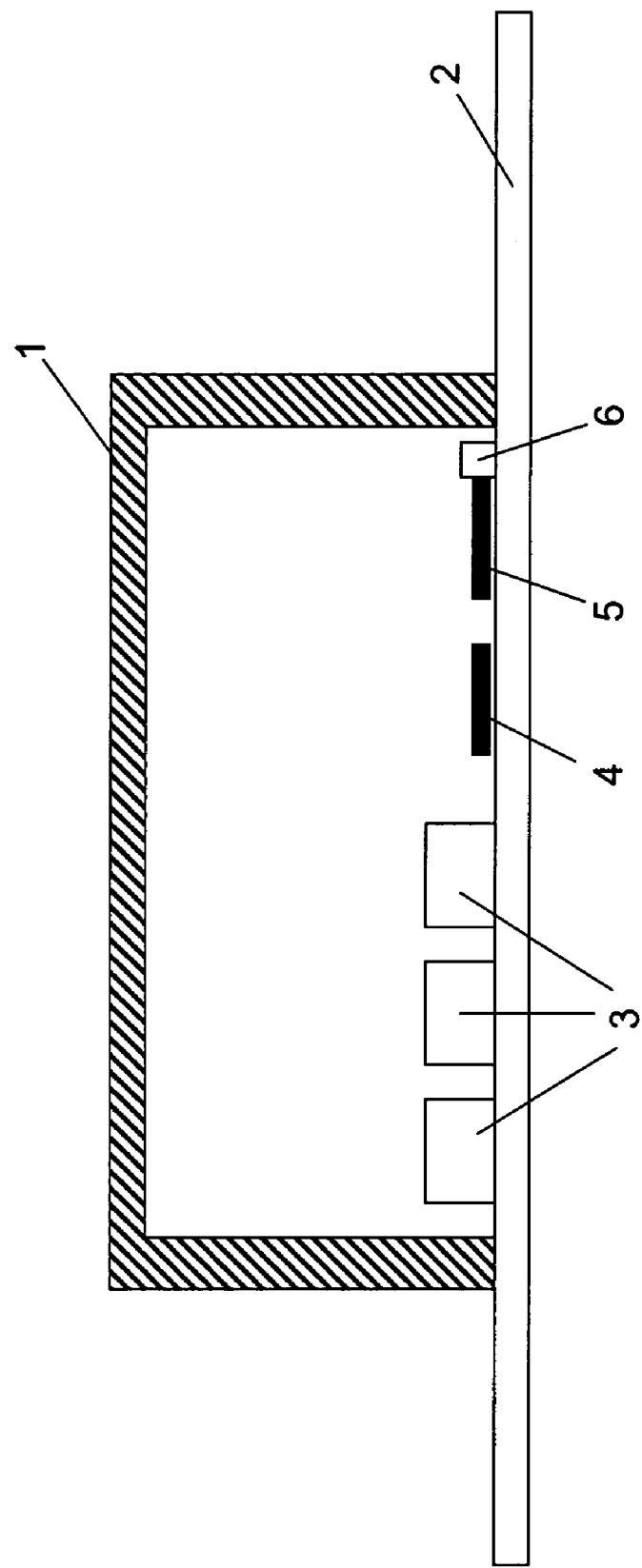
FIG. 1 illustrates a first anti-intrusion system variant according to the invention comprising at least one receiving antenna linked to a capacitive electromechanical microswitch, seen in cross section.
Figure 2:
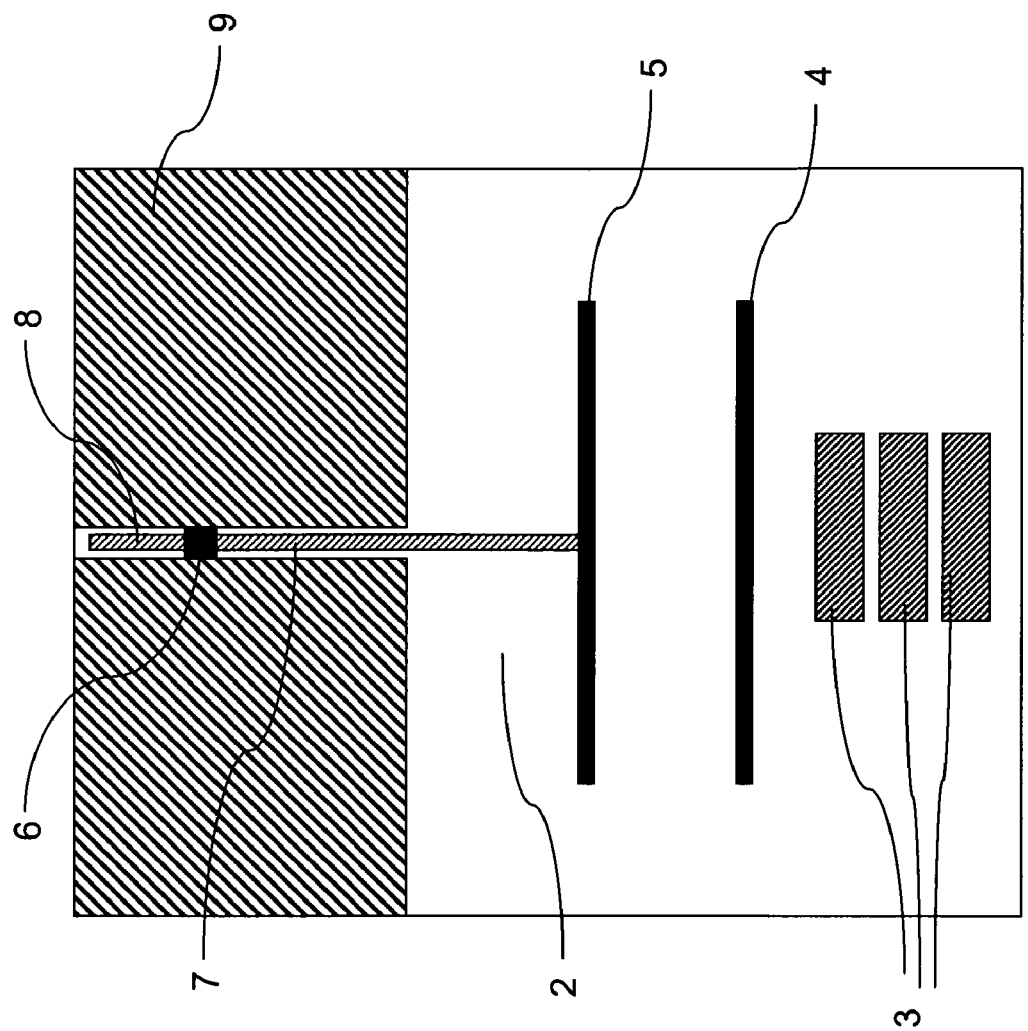
FIG. 2 illustrates the first anti-intrusion system variant according to the invention seen from above inside the enclosure.

A first variant of an anti-intrusion system for protecting electronic components according to the invention using a series-type capacitive electromechanical microswitch is illustrated in FIGS. 1 and 2.

The first variant of the system according to the invention comprises a hermetic and conducting enclosure 1 on the surface of a substrate 2, a transmitting antenna 4, a receiving antenna 5 linked to the warning system, not represented, by two transmission lines 7 and 8 above which there is a series-type capacitive electromechanical microswitch 6.

The anti-intrusion system works as follows. The system uses the variations of a reference signal, generated by a violation of the hermetic and conducting enclosure 1, to trigger the warning device. In practice, the system is armed by operating the series-type capacitive electromechanical microswitch 6 by placing it in the low state, the conducting state. A signal is then sent through the transmitting antenna 4, which is received by the receiving antenna 5 then transmitted to the warning device via the transmission lines 7 and 8. The warning device is configured to be triggered when it no longer receives a signal. Moreover, the power of this signal is determined in such a way as to maintain the series-type capacitive electromechanical microswitch 6 in the low (conducting) state according to the principle that will be explained in the next paragraph and that will be called self-maintenance. Any intrusion or attack on the physical integrity of the conducting enclosure 1 leads to a disturbance of the transmission of the signal from the transmitting antenna 4 to the receiving antenna 5, so reducing the power of the transmitted signal. This power reduction in the signal passing through the series-type capacitive electromechanical microswitch 6 provokes its transition to the high state (non-conducting). The warning device connected to the output of the series-type capacitive electromechanical microswitch 6 no longer receives any signal and is triggered.

There now follows a more detailed description of a series-type microswitch structure comprising:

A flexible membrane,
A dielectric layer,
A metallic layer.

Figure 3:
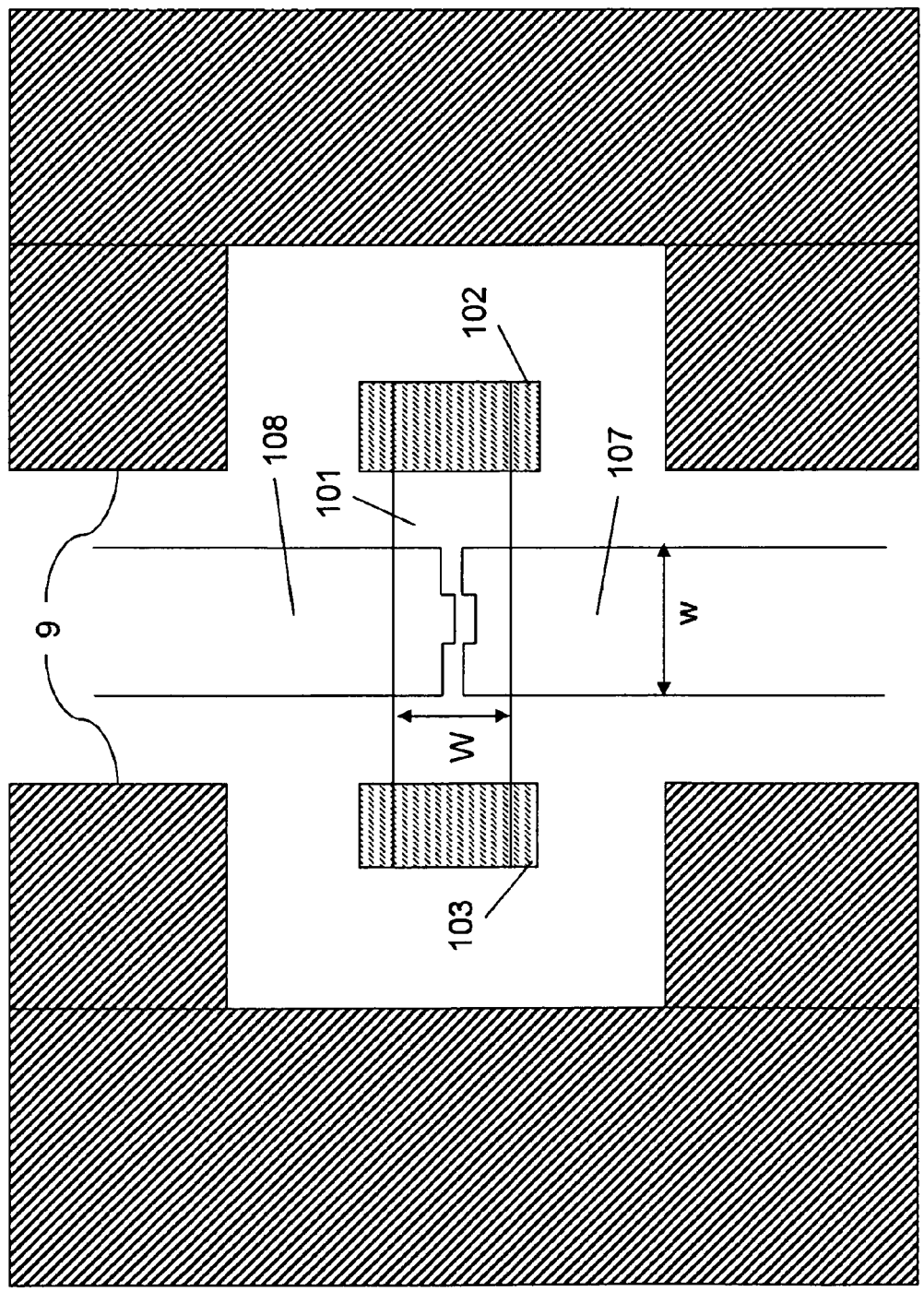
FIG. 3 illustrates a capacitive electromechanical microswitch of series type seen from above.
Figure 4:
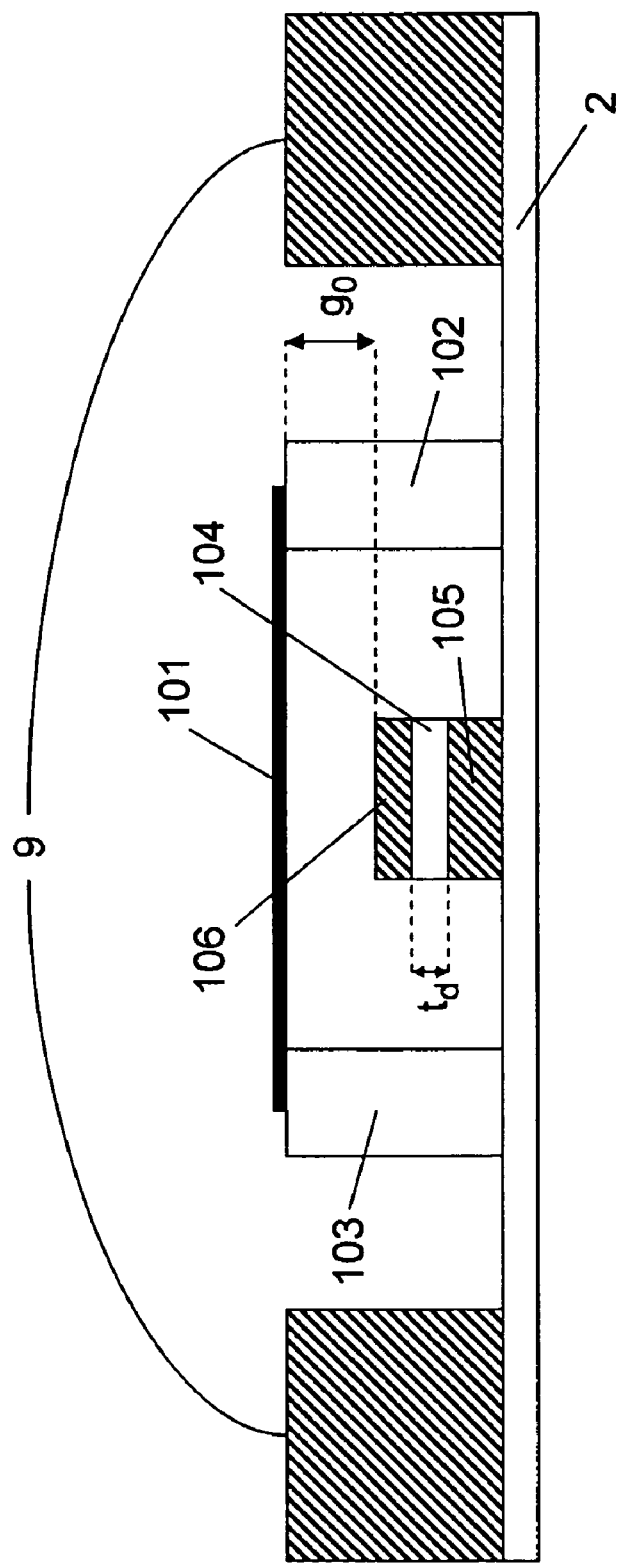
FIG. 4 illustrates the series-type capacitive electromechanical microswitch seen in cross section.

FIG. 3 represents a top view of such a microswitch and FIG. 4 represents a cross-section view.

The structure of the first microswitch in series comprises: a first signal line 107 (linked to the signal line 7) and a second signal line 108 (linked to the signal line 8) positioned coplanar in the extension of each other, separated by a switching zone, the ends of which form a metallic layer 105 which acts as a bottom electrode, positioned on the substrate 2, a dielectric material 104 placed on the metallic layer 105. A membrane 101 overhangs the signal lines, linking the pillars 102 and 103 placed on the substrate. The membrane is insulated from the ground plane 9.

Figure 5:
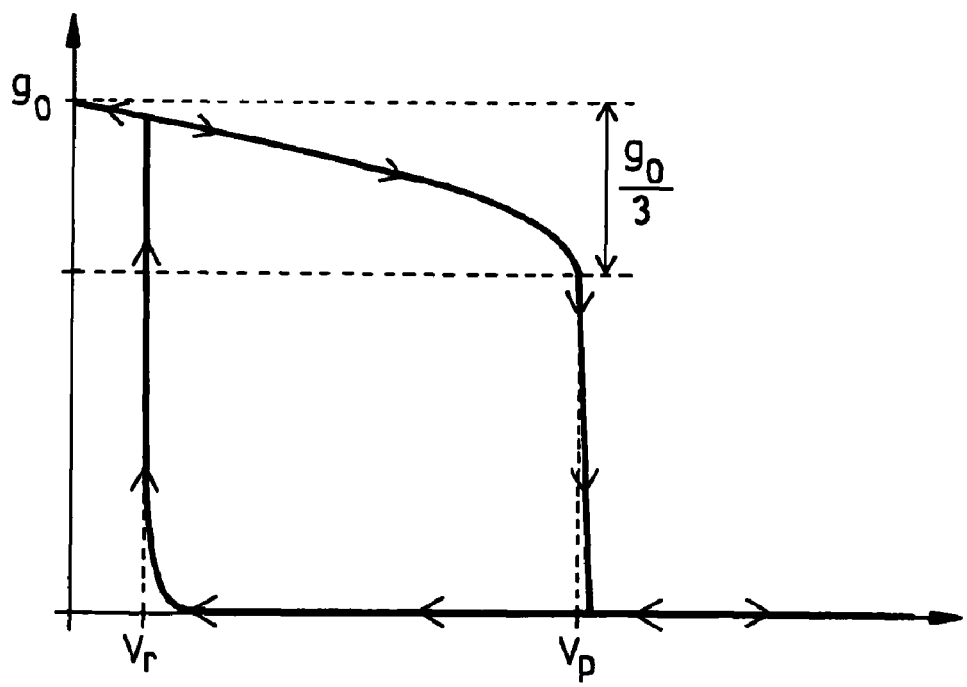
FIG. 5 illustrates the trend of the thickness of the dielectric gap as a function of the voltage applied to the series-type capacitive electromechanical microswitch when it is actuated.

The microswitch works as follows:

The application of an activation voltage under the membrane 101 changes it from an open, non-conducting rest state, to the closed, conducting, state. The microswitch has specific means (not described) for imposing a potential difference between the metallic layer 105 and the membrane 101. Under the effect of the activation voltage, the membrane is deformed until it touches the dielectric 104. The two signal lines 107 and 108 are then interlinked by capacitive effect. FIG. 5 illustrates the trend of the thickness of the dielectric gap as a function of the voltage applied to the series-type capacitive electromechanical microswitch when it is operated, g0 is the initial thickness of the dielectric gap between the membrane 101 and the dielectric 104.

The series microswitch is characterized by two voltages: Vp, the activation voltage and Vr the release voltage. Vp is determined by the following equation:

$$V_P = \sqrt{\frac{8kg_0^3}{27\varepsilon_0 wW}}$$

where w is the width of the signal lines, W the width of the membrane (the product wW then represents the surface area facing the signal lines and the membrane), $g_0$ is the thickness of the dielectric gap with no voltage applied, $\epsilon_o$: the permittivity of the vacuum and k the stiffness coefficient of the membrane.

Vr is determined by the following equation:

$$V_r = \sqrt{\frac{2k(g_0 - t_d)t_d^2}{\varepsilon' \varepsilon_0 A \varepsilon_r^2}}$$

where $t_d$ is the dielectric thickness separating the line from the membrane and $\epsilon_r$ the relative permittivity of the dielectric, A is equal to the product wW and $\epsilon'$ is a constant making it possible to take account of the effect of the presence of the dielectric gap which modifies the permittivity of the electrodes.

The $\epsilon'$ coefficient is between 0.4 and 0.8. It can be determined empirically by comparing the results of measurements with the theoretical calculation of a plane capacitance.

Let P be the power of the signal passing through the series microswitch and Veq the mean voltage corresponding to this power. The following relationship then applies:

$$P = \frac{V_{eq}^2}{R}$$

where R is the impedance of the signal line. The series microswitch can be in three possible states:
  Veq>Vp: this represents the self-actuation state. This means that the simple fact of passing the signal through the microswitch provokes its transition to the low state, the conducting state.
  Vr<Veq<Vp: this represents the self-maintaining state. This means that the simple fact of passing the signal through the microswitch prevents the membrane from rising again after actuation.
  Veq<Vr, the microswitch operates in a simple manner, the signal does not disrupt the operation of the microswitch which is in the high, non-conducting, state.

For the anti-intrusion system according to the invention, the power of the signal is dimensioned such that the limit of the second and of the third cases applies. The microswitch can then switch from the self-maintaining state to the high state if there is a slight reduction in the power of the signal.

Advantageously, at least one of the electromechanical microswitches comprises a second metal layer 106 situated on the dielectric 104. The benefit of the second metallic layer 106 is to overcome the problem of electrical discharge which ultimately takes place over time on the dielectric layer 104, representing a degradation to the level of the detection of the variations of power of the signal.

Figure 7:
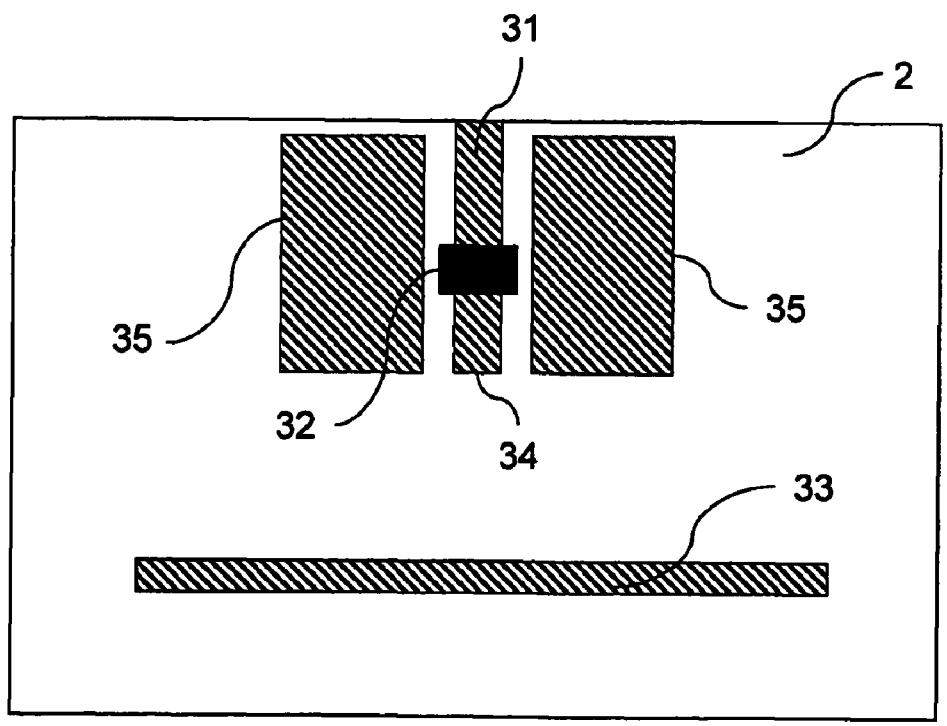
FIG. 7 illustrates a part of the second anti-intrusion system variant according to the invention, seen from above inside the enclosure.
Figure 6:
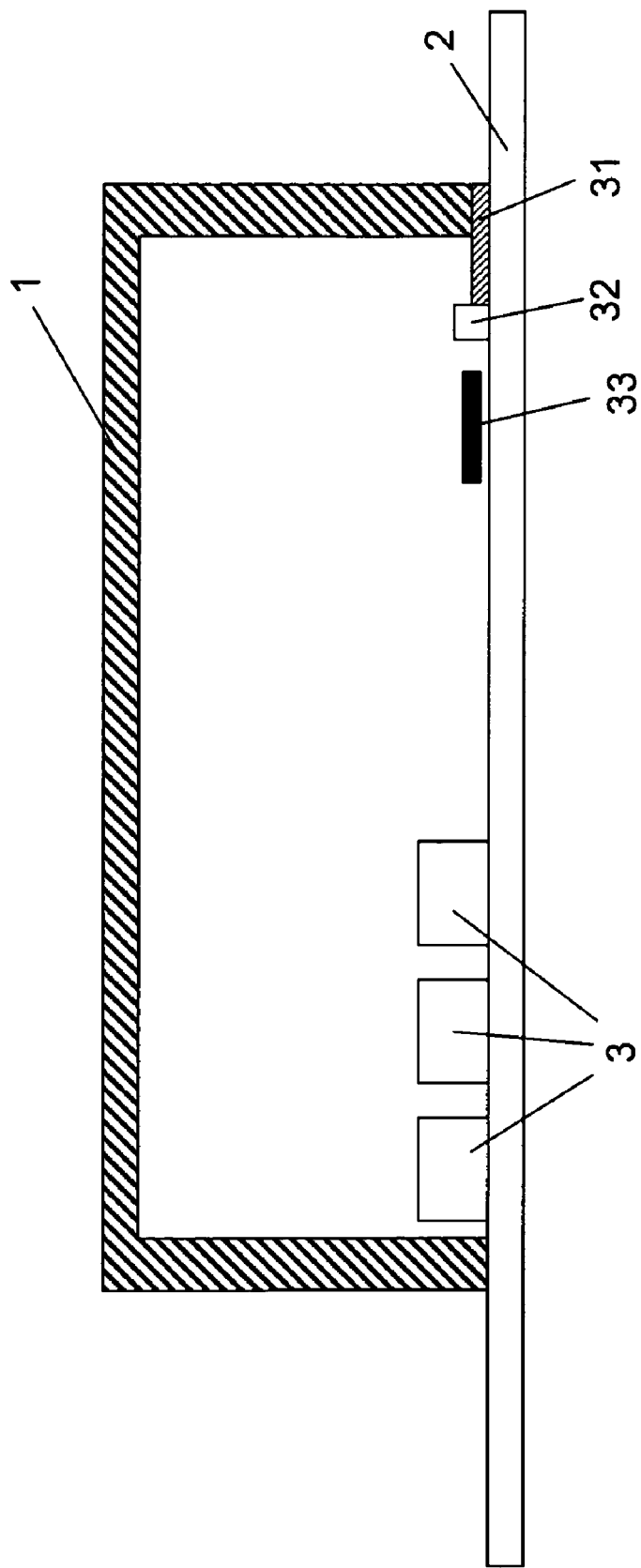
FIG. 6 illustrates a second anti-intrusion system variant according to the invention, with an electromechanical microswitch linked to the conducting enclosure by a conducting element, seen in cross section.
Figure 8:
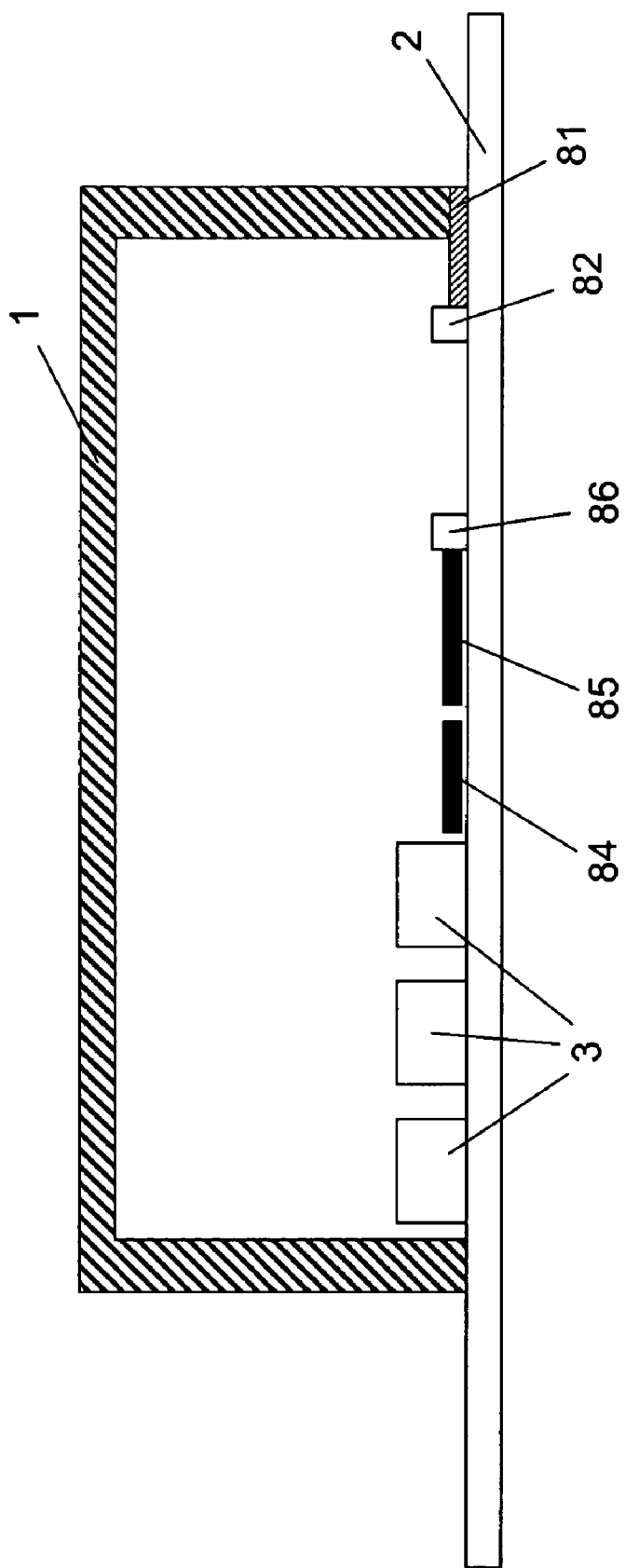
FIG. 8 illustrates a third anti-intrusion system variant according to the invention, comprising at least one receiving antenna linked to a first capacitive electromechanical microswitch and a second capacitive electromechanical microswitch linked to the conducting enclosure by a conducting element, seen in cross section.

There now follows a description of a second anti-intrusion system variant according to the invention, illustrated notably by FIGS. 6 and 7, where an electromechanical microswitch 32 is linked to the conducting enclosure 1 by a first conducting element 31. Also, the electromechanical microswitch 32 is linked to the warning device by a second conducting element 34.

The second anti-intrusion system variant works as follows. The system uses the disturbances of the eddy currents generated by the antenna 33 on the enclosure. A violation of the enclosure is reflected in a variation of these eddy currents. As in the first anti-intrusion system variant, it is this variation that will be used to change the state of the electromechanical microswitch 32. The lowering of the power of the signal passing through the signal switches it from a low (conducting) state to a high (non-conducting) state which causes the warning device, configured to be triggered when it no longer receives any signal, to be activated.

There now follows a description of a third anti-intrusion system variant according to the invention using the two preceding variants in parallel. The third anti-intrusion system variant according to the invention comprises a hermetic and conducting enclosure 1 placed on a substrate 2; a first detection assembly comprising a transmitting antenna 84, a receiving antenna 85 linked to the warning system, not represented, by a transmission line, not represented, above which there is a first series-type capacitive electromechanical microswitch 86 and a second detection assembly comprising a second series-type capacitive electromechanical microswitch 82 linked to the hermetic and conducting enclosure 1 by a first conducting element 81 and linked to the warning device by a second conducting element, not represented.

The third anti-intrusion system variant works as follows. The two detection assemblies operate in parallel. The first detection assembly corresponds to the first detection system variant. The second detection assembly corresponds to the second detection system variant. The two detection assemblies can use the same transmitting antenna 84.

Advantageously, at least one of the conducting elements is situated on the surface of the substrate 2.

Advantageously, the transmitting and receiving antennas are of bidirectional type.

According to an exemplary embodiment of an electromechanical microswitch for a protection system according to the invention, the membrane 101 has a thickness of 0.7 μm consisting of two metallic layers: a first aluminum layer of 0.5 μm and a second titanium-tungsten alloy layer of 0.2 μm. The membrane 101 presents a width of approximately 100 μm and a length dependent on the coplanar line.

A coplanar line is a microwave signal conductor consisting of a substrate (generally of silicon, given its low cost and the little influence that the quality of the substrate can have on the performance of a coplanar line) on which there is a metallic conducting line (generally of gold) and two ground planes situated either side of this line (generally also of gold). A coplanar line is defined by: the thickness of the line and of the ground planes, the width of the central line and the distance separating the central line from the ground planes. A symmetrical structure relative to the central line is thus obtained.

The coplanar lines 107 and 108 that serve as a support for the capacitive electromechanical microswitch have a thickness of 3 μm, they are refined under the membrane to a thickness of 0.7 μm. They are covered in this location by a dielectric of a thickness varying between 0.2 and 0.4 μm.

The pillars 102 and 103, 3 μm high, are positioned either side of the signal lines 107 and 108 to serve as a support for the membrane 101 and are independent of the ground 9 which is hollowed out in order to be able to have the pillars 102 and 103 at the same level as said ground. The space separating the signal lines 107 and 108 is 10 μm.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An anti-intrusion system for protecting electronic components comprising a substrate on which the electronic components are placed, a conducting enclosure encapsulating the electronic components on the surface of the substrate, said system also including a warning device, characterized in that it comprises an encapsulated intrusion detection circuit in said enclosure, said intrusion detection circuit comprising at least: a transmitting antenna situated on the surface of the substrate and transmitting a power signal, a capacitive electromechanical microswitch associated with means of receiving said power signal and said microswitch being able to detect a signal power drop and, where appropriate, activate an intrusion warning device, means of receiving the transmitted signal, said reception means transmitting a signal drop on an intrusion into the enclosure, said reception means being linked to said microswitch, wherein the transmitting antenna transmits a power signal such that, for the microswitch the voltage Veq applied between the membrane and the electrode is between an activation voltage Vp and a release voltage Vr, said activation and release voltages respectively satisfying the following equations:

$$V_p = \sqrt{\frac{8kg_0^3}{27\varepsilon_0 wW}}$$

where w is the width of the signal lines, W is the width of the membrane, $g_o$ is the thickness of the dielectric gap without voltage applied, $\epsilon_o$: the permittivity of the vacuum and k the stiffness coefficient of the membrane.

$$V_r = \sqrt{\frac{2k(g_0 - t_d)t_d^2}{\varepsilon'\varepsilon_0 A\varepsilon_r^2}}$$

where $t_d$ is the dielectric thickness separating the metallic layer from the membrane, $\epsilon_r$ the relative permittivity of the dielectric and $\epsilon'$ a constant making it possible to take account of the effect of the presence of the dielectric gap which modifies the permittivity of the electrodes and A is equal to the product wW.

2. The anti-intrusion system as claimed in claim 1, wherein the reception means comprise: a receiving antenna situated on the surface of the substrate and linked to the capacitive electromechanical microswitch.

3. The anti-intrusion system as claimed in claim 1, wherein the reception means comprise: a conducting element linked to the conducting enclosure and to the capacitive electromechanical microswitch.

4. The anti-intrusion system as claimed in claim 1, wherein the reception means comprise:
   a receiving antenna situated on the surface of the substrate and linked to a first capacitive electromechanical microswitch,
   a conducting element linked to the conducting enclosure and to a second capacitive electromechanical microswitch.

5. The anti-intrusion system as claimed in claim 1, wherein at least one of the capacitive electromechanical microswitches is of series type.

6. The anti-intrustion system as claimed in claim 3, wherein at least one of the conducting elements is placed on the surface of the substrate.

7. The anti-intrusion system as claimed in claim 1, wherein at least one of the electromechanical microswitches comprises a structure including a flexible membrane and an assembly comprising a dielectric layer, and two signal lines and positioned coplanar in the extension of each other and the ends of which form a first metallic layer, said membrane being separated from the assembly by a dielectric gap.

8. The anti-intrusion system as claimed in claim 1, wherein at least one of the electromechanical microswitches comprises a second metal layer situated on the dielectric.

9. The anti-intrusion system as claimed in claim 1, wherein the conducting enclosure is made of metal.

10. The anti-intrusion system as claimed in claim 1, wherein the transmitting and receiving antennas are of bidirectional type.

* * * * *